F. A. PEQUEGNAT AND C. C. KNOLL.
SPEED CONTROLLER.
APPLICATION FILED SEPT. 20, 1916.
1,338,191.
Patented Apr. 27, 1920.
2 SHEETS—SHEET 1.
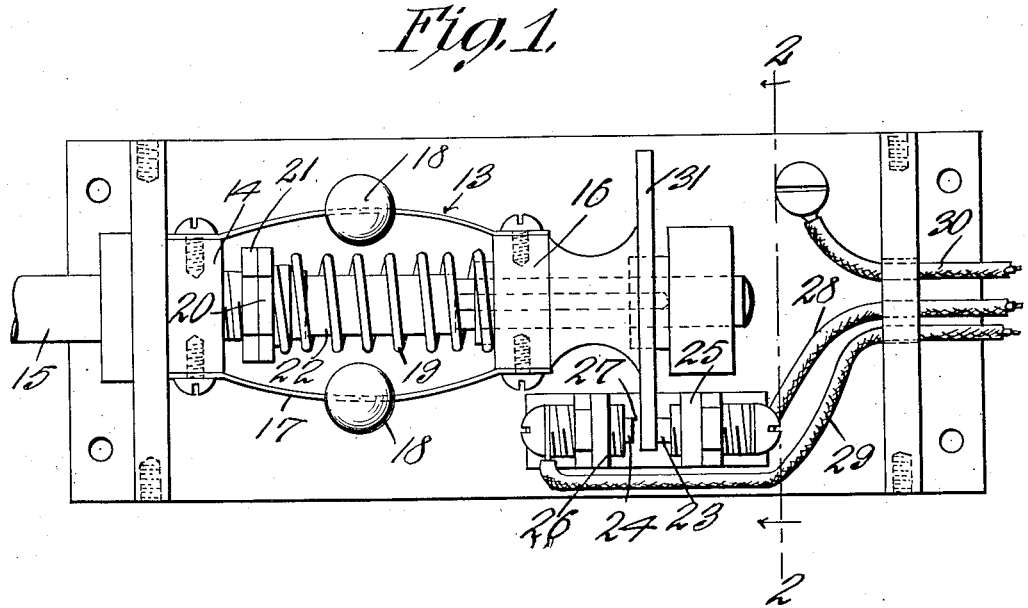
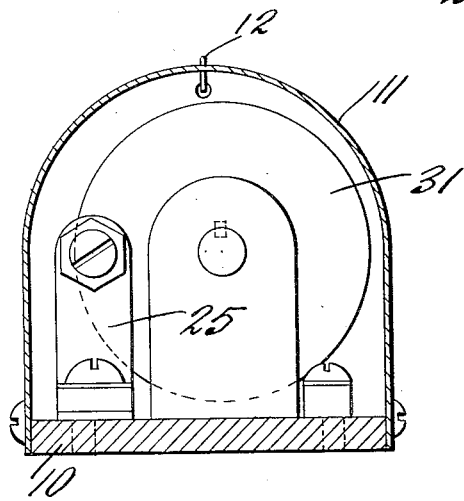
F. A. Pequegnat and
C. C. Knoll
Inventors
by C. A. Snow & Co.
Attorneys
Witnesses

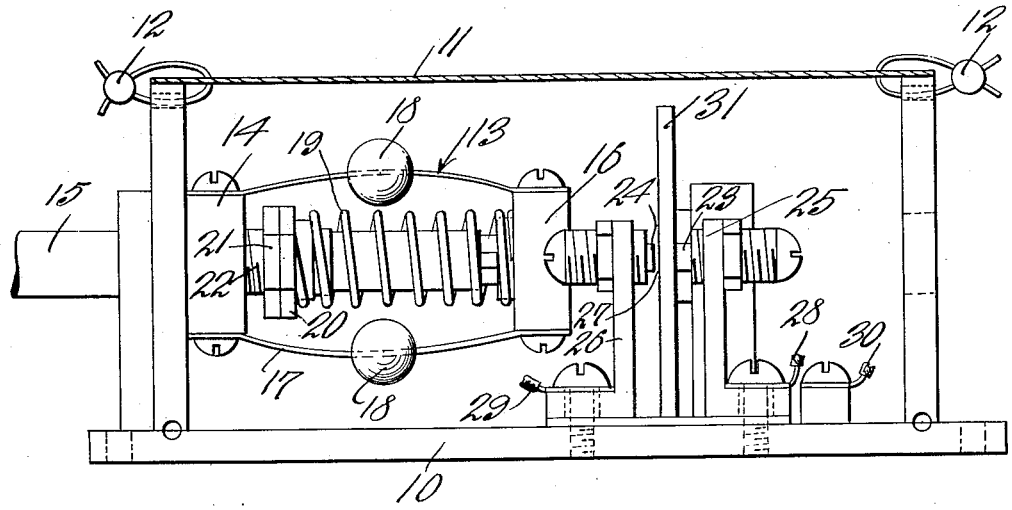
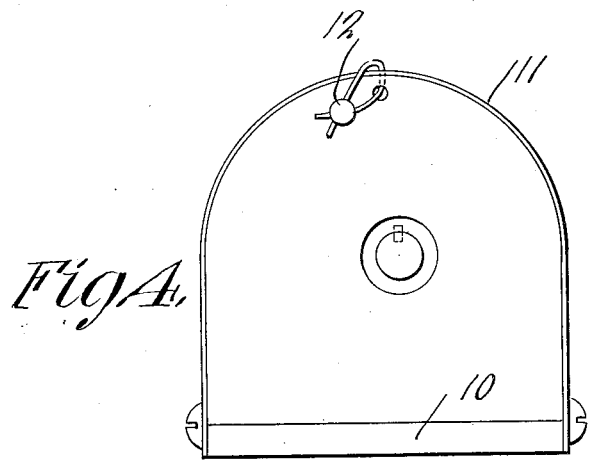

UNITED STATES PATENT OFFICE.

FRANK A. PEQUEGNAT AND CHARLES C. KNOLL, OF RIVERSIDE, CALIFORNIA.

SPEED-CONTROLLER.

1,338,191. Specification of Letters Patent. Patented Apr. 27, 1920.

Application filed September 20, 1916. Serial No. 121,290.

*To all whom it may concern:*

Be it known that we, FRANK A. PEQUEGNAT and CHARLES C. KNOLL, citizens of the United States, residing at Riverside, in the county of Riverside, State of California, have invented a new and useful Speed-Controller, of which the following is a specification.

The object of the invention is to provide simple, inexpensive and efficient means whereby the speed of an automobile or similar power driven vehicle may be prevented automatically from exceeding a certain limit which may be fixed by the authorities, the controlling means being under seal and therefore inaccessible to the operator of the machine except by such manipulation as may be detected, the variations of speed of travel within said limit being as usual under the control of the operator.

Further objects of the invention will appear as the description proceeds, it being understood that changes in the precise embodiment of the invention herein disclosed, can be made within the scope of what is claimed, without departing from the spirit of the invention.

In the accompanying drawings:—

Figure 1 is a plain view of an apparatus constructed in accordance with the invention, the casing being omitted.

Fig. 2 is a vertical transverse sectional view of the same on the plane indicated by the line 2—2 of Fig. 1.

Fig. 3 is a side elevation of the apparatus, the cover being in section.

Fig. 4 is an end view.

Within a casing consisting in the construction illustrated of a base 10 and a shell 11, held in closed position normally by sealing means 12, is a centrifugal governor 13 having a fixed collar 14 on a driven shaft 15 which may be operatively connected in any suitable or convenient manner to a road wheel, drive or other shaft (preferably a final drive), and a movable collar 16 connected with the fixed collar by means of the yielding elements or bowed springs 17 carrying the centrifugal balls 18. A resistance spring 19 is interposed between the two collars and is adjustable in tension by means of the nut 20 which is adapted to be secured against accidental movement by the lock nut 21. Said adjusting nut is threaded upon the portion 22 of the driven shaft 15.

Arranged within the casing are adjustable contacts 23 and 24 mounted respectively in brackets 25 and 26 to permit of their movement toward and from each other to vary the extent of the gap 27. Connected respectively with said contacts are battery and magneto circuit conductors 28 and 29, either or both of which may be used according to the ignition system employed in the vehicle to which the apparatus may be applied. Also entering the casing is a ground wire 30.

When the battery circuit is used in the ignition system the spring 19 normally holds the collar 16 in position to maintain the moveable disk contact 31 in engagement with the battery contact 23, and this relative arrangement of the parts may be maintained until the speed of rotation of the shaft 15 exceeds a predetermined limit determined for example by the adjustment of the spring 19 and the adjustment of said contact 23. When said speed is exceeded, however, the centrifugal action of the balls 18 will cause the retraction of the collar 16 and the movement of the movable contact 31 out of engagement with the battery contact, thus breaking the circuit and rendering the ignition system through the batteries inactive until the speed of the shaft 15 is reduced to or below the said predetermined limit.

As it is particularly desirable to control the speed of movement of the vehicle, rather than that of the engine, so that the operation of the latter may not be affected when the vehicle is being driven under intermediate or low speed gears, the driven shaft 15 should therefore be connected as noted to a road wheel, drive shaft or other shaft (preferably the final drive) but it is not deemed necessary to illustrate such connections specifically herein.

When a magneto circuit is used in the ignition system, the operation of the governing mechanism is the same as above noted except that the movement of the movable contact 31 brings it into contact with the stationary ignition contact 24, thereby grounding or short circuiting said magneto and discontinuing the operation of the sparking mechanism until the speed of the vehicle has been sufficiently reduced to permit of the breaking of the contacts 31—24.

In the event that only one of these ignition systems is in use on the same car, one or the other of the stationary contacts may be withdrawn or moved out of engaging system. On the other hand, when both systems are employed as for example the battery circuit in starting the machine and the magneto circuit during general running operation, the arrangement illustrated and herein described may be employed so that the governing devices will operate, without readjustment, whether at the particular time that the speed limit is exceeded, the car is operated under either the battery or the magneto influence.

By means of the device described it will be possible for authorities to fix the maximum speed of motor driven vehicles and place it beyond the power of the engine operators to exceed that limit without breaking the ignition circuit and thereby cutting off the power.

What is claimed is:—

A circuit closing device, embodying a shaft, a pair of collars thereon, one fixed and the other slidable longitudinally, springs having their ends secured to said collars, weights carried by said springs between their ends, a contact disk carried by the movable collar, said springs being normally bowed, adjustable means on the shaft between the collars, and an expansion spring between and held under desired compression by said adjustable means and movable collar for urging said collar away from the fixed collar and tending to straighten out the bowed springs.

In testimony that we claim the foregoing as our own, we have hereto affixed our signatures in the presence of two witnesses.

FRANK A. PEQUEGNAT.
CHARLES C. KNOLL.

Witnesses:
BERNICE A. HODGE,
S. N. McNABB